(12) United States Patent
Nakayama et al.

(10) Patent No.: US 6,493,748 B1
(45) Date of Patent: Dec. 10, 2002

(54) INFORMATION MANAGEMENT SYSTEM, LOCAL COMPUTER, SERVER COMPUTER, AND RECORDING MEDIUM

(75) Inventors: Yasushi Nakayama, Kawasaki (JP); Mitsuru Osawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 09/624,388

(22) Filed: Jul. 27, 2000

Related U.S. Application Data

(63) Continuation of application No. PCT/JP99/00763, filed on Feb. 19, 1999.

(30) Foreign Application Priority Data

Mar. 5, 1998 (JP) ............................................ 10-053331

(51) Int. Cl.⁷ ............................................. G06F 15/16
(52) U.S. Cl. ...................................................... 709/218
(58) Field of Search ................................ 709/217, 218, 709/219

(56) References Cited

U.S. PATENT DOCUMENTS

| | | | | |
|---|---|---|---|---|
| 5,862,325 A | * | 1/1999 | Reed et al. ................... | 709/201 |
| 6,088,717 A | * | 7/2000 | Reed et al. ................... | 709/201 |
| 6,134,584 A | * | 10/2000 | Chang et al. ................. | 709/219 |
| 6,182,122 B1 | * | 1/2001 | Berstis ......................... | 709/217 |
| 6,341,316 B1 | * | 1/2002 | Kloba et al. .................. | 709/248 |
| 6,345,288 B1 | * | 2/2002 | Reed et al. ................... | 709/201 |
| 6,351,467 B1 | * | 2/2002 | Dillon .......................... | 709/219 |

FOREIGN PATENT DOCUMENTS

| | | | |
|---|---|---|---|
| JP | 09146818 A | 6/1997 | |
| JP | 09212405 A | 8/1997 | |
| JP | 09258966 A | 10/1997 | |
| JP | 10021134 A | 1/1998 | |
| JP | 10049422 A | 2/1998 | |

OTHER PUBLICATIONS

Kouich Kajitani, "Analysis of Disk Array Management for Digital Video Server", Tokyo Research Laboratory, IBM Japan Ltd., vol. J77–D–I, No. 1, pp. 66–76, Jan. 1994.

* cited by examiner

*Primary Examiner*—David Y. Eng
(74) *Attorney, Agent, or Firm*—Staas & Halsey LLP

(57) ABSTRACT

Contents on a server that need not be updated for a fixed period of time are recorded directly in a medium, and desired contents in a local device can be accessed by the same operation procedure as that for accessing the server storing the contents. When a request to acquire delivery information is made from information browsing unit with respect to a local proxy server, the local proxy server analyzes the request, and acquires a server-side control file managed by a server with respect to which the request has been made, and a local-side control file in duplicate information storing unit. If corresponding information exists in the duplicate information storing means and also if the information has the latest version number, the information is fetched from the duplicate information storing unit; otherwise the delivery information is fetched from a server computer.

18 Claims, 16 Drawing Sheets

42 SYNCHRONIZATION FILE

START TIME 1, END TIME 1, RELEVANT URL
START TIME 2, END TIME 2, RELEVANT URL
.
.
.

FIG. 11

```
                                    ┌─ 96  SOURCE CONTROL
                                    │         INFORMATION
┌───────────────────────────────────┴──────────────────────┐
│ BASS.ra,   00:00:00, 00:03:00   ;BASS SOUND, FROM START TO END │
│ Live3.ra,  00:00:00, 00:03:00   ;DRUMS, FROM START TO END      │
│ Live1.ra,  00:00:10, 00:01:00   ;PIANO, FROM 00:10 TO 01:00    │
│ Live2.ra,  00:00:30, 00:02:00   ;GUITAR, FROM 00:30 TO 02:00   │
│ Live1.ra,  00:02:00, 00:03:00   ;PIANO, FROM 02:00 TO 03:00    │
│ Live2.ra,  00:02:30, 00:03:00   ;GUITAR, FROM 02:30 TO 03:00   │
└──────────────────────────────────────────────────────────┘
```

INFORMATION MANAGEMENT SYSTEM, LOCAL COMPUTER, SERVER COMPUTER, AND RECORDING MEDIUM

This continuing application is filed under 35 U.S.C. §111(a), based upon International Application PCT/JP99/00763, filed Feb. 19, 1999, it being further noted that priority is based upon Japanese Patent Application HEI 10-053331, filed Mar. 5, 1998.

BACKGROUND OF THE INVENTION

1. Field of the Invention

The present invention relates to an information management system, a local computer, a server computer, a computer-readable recording medium recording an information acquisition program and a computer-readable recording medium recording a server program, and more particularly, to an information management system, local computer, server computer, computer-readable recording medium recording an information acquisition program and computer-readable recording medium recording a server program for handling information delivered through a network.

2. Description of the Related Art

As a result of recent rapid popularization of the Internet, it is usually the case that a plurality of servers are started within a server computer to provide a large number of users with innumerable contents such as HTML (Hyper Text Markup Language)-based text, JPEG (Joint Photographic Experts Group) files, GIF (Graphics Interchange Format) files, and sound files. Image files like JPEG files and sound files have large file size as compared with text files, and thus take time to be transmitted. Consequently, the amount of information transmitted over lines drastically increases, causing overloading of lines.

To avoid such line congestion, contents once accessed are cached in a local medium (such as a hard disk unit). This permits the cached contents to be read out from the local medium when accessed again, so that the amount of information transmitted over communication lines can be reduced.

The method of caching contents is, however, associated with a problem that information must always be transferred from a server when accessed for the first time. Also, cached data is usually kept only for a limited term, and therefore, access after expiry of the term is influenced all the same by the capacity of transmission lines.

Meanwhile, some contents on the Internet are updated almost every day, while others need not be updated for a fixed period of time. For example, contents such as a list of participants in some meeting scarcely need to be updated after the meeting schedule and the participants are fixed until the end of the meeting. Moreover, if particular members alone are to attend such a meeting, it is enough that the contents about the meeting can be viewed only by the members concerned.

Such specific contents may therefore be recorded in CD-ROMs (Compact Disk Read Only Memories) and the CD-ROMs may be distributed to those who require the contents. In this case, however, when the contents are recorded in the media, inter-content links must be rewritten. Specifically, where HTML files exist in a server, links and image files to be shown in-line are designated by URLs (Uniform Resource Locators) assigned to respective designated files on the server. Accordingly, in the case of storing, in a CD-ROM, contents including linked files and image files to be shown in-line, the location of files to be designated should be the local medium. To permit the local medium to be accessed as the target of links, the URL specifications need to be rewritten so as to include the local name. Rewriting the URLs of all HTML files, however, consumes much labor and time.

SUMMARY OF THE INVENTION

Taking the above into consideration, an object of the present invention is to provide an information management system which records, directly in a medium, contents on a server that need not be updated for a fixed period of time and which permits desired contents in a local device to be accessed by the same operation procedure as that for accessing the server storing the contents.

To accomplish the above object, according to the present invention, there is provided an information management system for management of information delivered through a network, comprising:

a server computer including delivery information storing means for storing delivery information to be delivered through the network and a server-side control file in which attribute information of the delivery information is registered, and a server for delivering, in response to a request, information stored in the delivery information storing means; and a local computer including duplicate information storing means for storing duplicate information corresponding to the delivery information in the delivery information storing means and a local-side control file in which are registered location information indicative of a location within the delivery information storing means where the duplicate information existed and attribute information of the duplicate information, and request relaying means, responsive to a request to acquire the delivery information stored in the delivery information storing means, for acquiring the server-side control file and the local-side control file, comparing the attribute information of the requested delivery information with the attribute information of the duplicate information corresponding to the requested delivery information, and determining information to be acquired in accordance with a result of comparison.

BRIEF DESCRIPTION OF THE DRAWINGS

FIG. 11 is a diagram showing an example of a synchronization file;

FIG. 15 is a diagram showing an example of source control information; and

DESCRIPTION OF THE PREFERRED EMBODIMENTS

An embodiments of the present invention will be hereinafter described with reference to the drawings.

Figure 1:
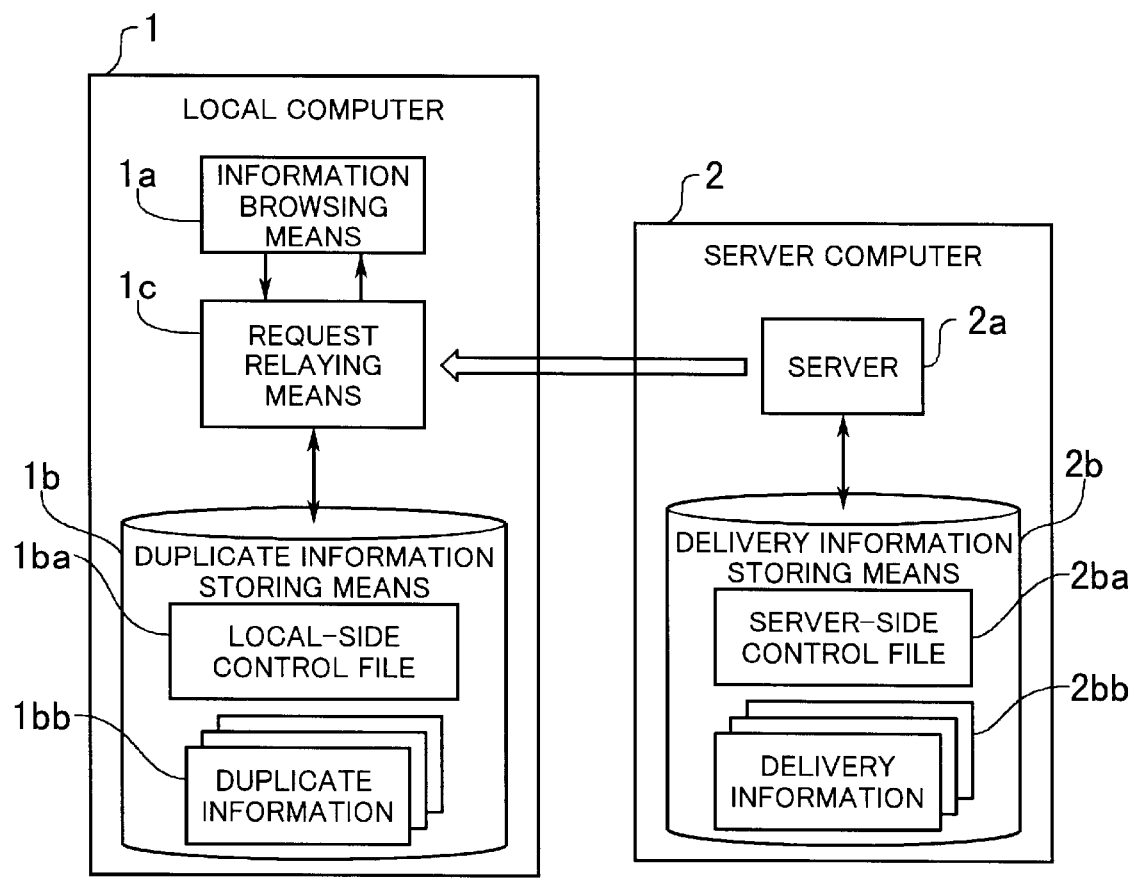
FIG. 1 is a diagram illustrating a theoretical configuration according to the present invention.

FIG. 1 shows a theoretical configuration according to the present invention, which configuration comprises a local computer 1 and a server computer 2 interconnected by a network.

The server computer 2 includes delivery information storing means 2b for storing delivery information 2bb to be delivered through the network and a server-side control file 2ba in which attribute information of the delivery information 2bb is registered, and a server 2a for delivering, in response to a request, information stored in the delivery information storing means 2b.

The local computer 1 includes duplicate information storing means 1b which stores duplicate information 1bb corresponding to the delivery information 2bb in the delivery information storing means 2b and a local-side control file 1ba in which are registered location information indicative of a location within the delivery information storing means 2b where the duplicate information 1bb existed and attribute information of the duplicate information 1bb. The local computer also includes request relaying means 1c which, on receiving a request to acquire the delivery information 2bb stored in the delivery information storing means 2b, acquires the server-side control file 2ba and the local-side control file 1ba, compares the attribute information of the requested delivery information 2bb with the attribute information of the duplicate information 1bb corresponding to the requested delivery information 2bb, and determines information to be acquired in accordance with the result of comparison.

With this information management system, when a request to acquire the delivery information 2bb is made from information browsing means 1a with respect to the request relaying means 1c, the request relaying means 1c receives the request and analyzes its content. The request relaying means 1c then acquires the server-side control file 2ba managed by the server 2a with respect to which the request has been made, as well as the local-side control file 1ba in the duplicate information storing means 1b. In this case, confirmation is made as to whether or not the requested information is stored in the duplicate information storing means 1b, and if the requested information is stored, it is determined whether or not the duplicate information 1bb in the duplicate information storing means 1b has the latest version number. If the requested information exists in the duplicate information storing means 1b and at the same time its version number is latest, the information is fetched from the duplicate information storing means 1b; otherwise the delivery information 2bb is fetched from the server computer 2.

This serves to reduce the amount of information to be acquired from the server computer 2, and the operation procedure on the part of the information browsing means 1a is the same as that for accessing the server computer 2 and need not be changed.

The present invention provides even more remarkable advantages when applied to a wide area network such as the Internet. In the case of the Internet, the server 2a is a WWW server or a streaming server, and the information browsing means 1a corresponds to a WWW browser.

Embodiments of the present invention will be now described with reference to the case of browsing HTTP contents and reproducing streaming contents, by way of example. The streaming content is a content that is transferred continually in time to permit multimedia data such as sound or video to be reproduced while being downloaded. Streaming data is divided into unit information to be transferred, and this unit information is called clip.

Figure 2:
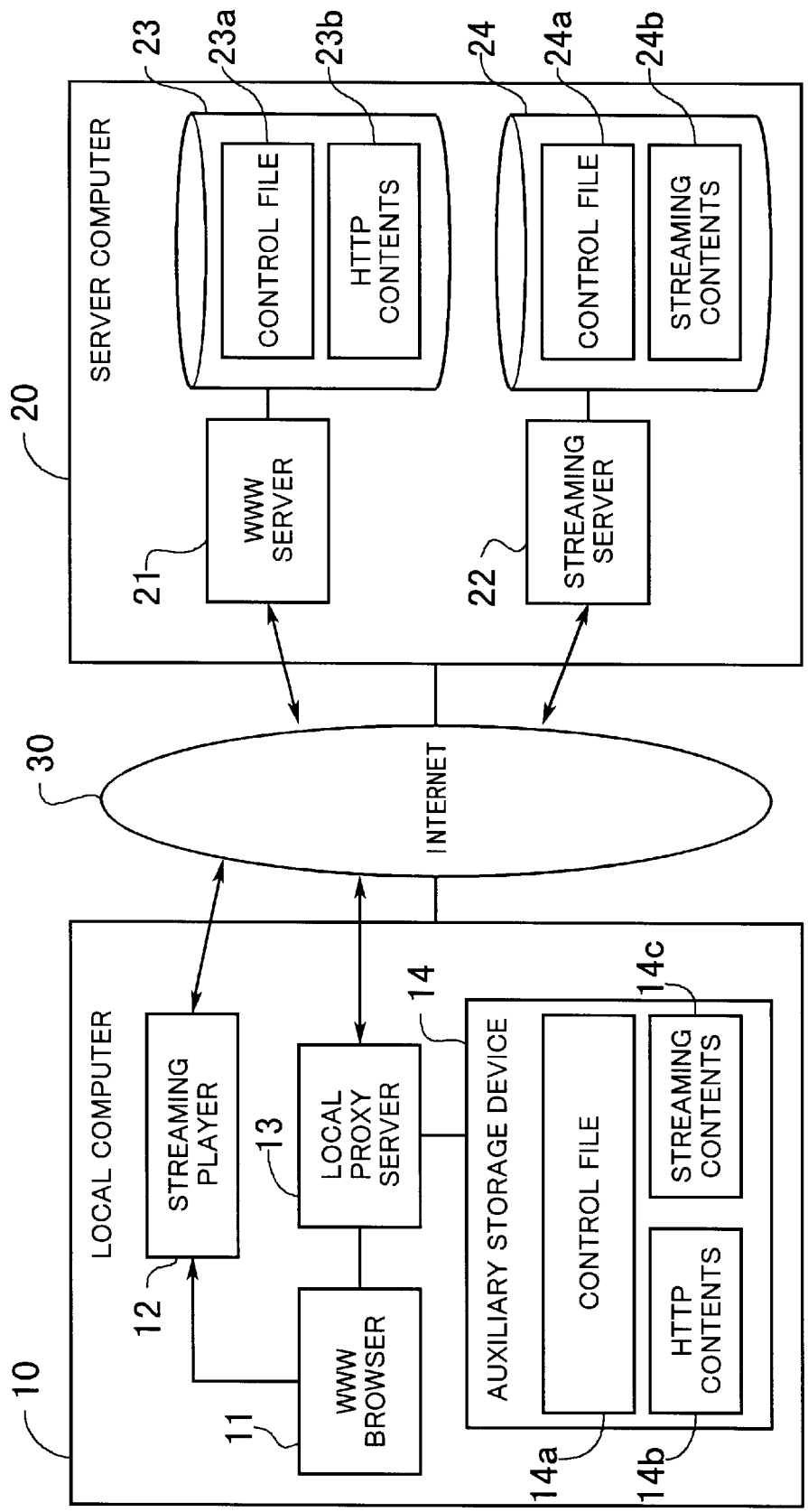
FIG. 2 is a diagram illustrating a configuration according to a first embodiment of the present invention.

FIG. 2 shows a configuration according to a first embodiment of the present invention. As illustrated in the figure, a local computer 10 and a server computer 20 are connected to each other through the Internet 30.

The local computer 10 is provided with a WWW browser 11, a streaming player 12, a local proxy server 13, and an auxiliary storage device 14.

The WWW browser 11 outputs, via the local proxy server 13, a request to the server computer 20. To this end, an external proxy server setting function available in ordinary WWW browsers is used. Specifically, in the WWW browser 11, the proxy server is set as "localhost (IP address= 127.0.0.1)". This makes it possible to designate the proxy server (in this example, the local proxy server 13) within the local computer 10 on which the WWW browser 11 is running, whereby a request from the WWW browser 11 can be relayed via the local proxy server 13.

The streaming player 12 outputs a request to a streaming server 22 in response to a request from the WWW browser 11, and reproduces the streaming content sent from the server.

The local proxy server 13 relays a request that the WWW browser 11 outputs with respect to the server computer 20, and acquires control files 24a and 14a associated with the requested content from both the server computer 20 and the auxiliary storage device 14. Based on the acquired control files 14a and 24a, the local proxy server determines whether or not a streaming content 14c in the auxiliary storage device 14 is the latest one. If the streaming content is the latest one, the local proxy server reads out this streaming content from the auxiliary storage device 14; otherwise it acquires, via the Internet 30, a streaming content 24b stored in the server computer 20.

The auxiliary storage device 14 includes a portable recording medium, such as a CD-ROM, and a readout device for reading out data from the medium. The recording medium stores the control file 14a, HTTP contents 14b, and streaming contents 14c. The control file 14a is a file holding information such as the version numbers of the HTTP contents 14b and streaming contents 14c, the original storage locations of the contents, etc. The HTTP contents 14b and the streaming contents 14c are data which were obtained previously by directly copying HTTP contents 23b and streaming contents 24b, respectively, stored in the server computer 20.

The server computer 20 includes a WWW server 21 and the streaming server 22 provided respectively with databases 23 and 24. The database 23 stores a control file 23a and HTTP contents 23b, and the database 24 stores a control file 24a and streaming contents 24b.

In response to a request from the local computer 10, the WWW server 21 sends the control file 23a or HTTP content 23b in the database 23. The streaming server 22 sends the control file 24a in the database 24 in response to a request from the local computer 10, and also sends a streaming content 24b in response to a request from the streaming player 12 of the local computer 10.

Figure 3:
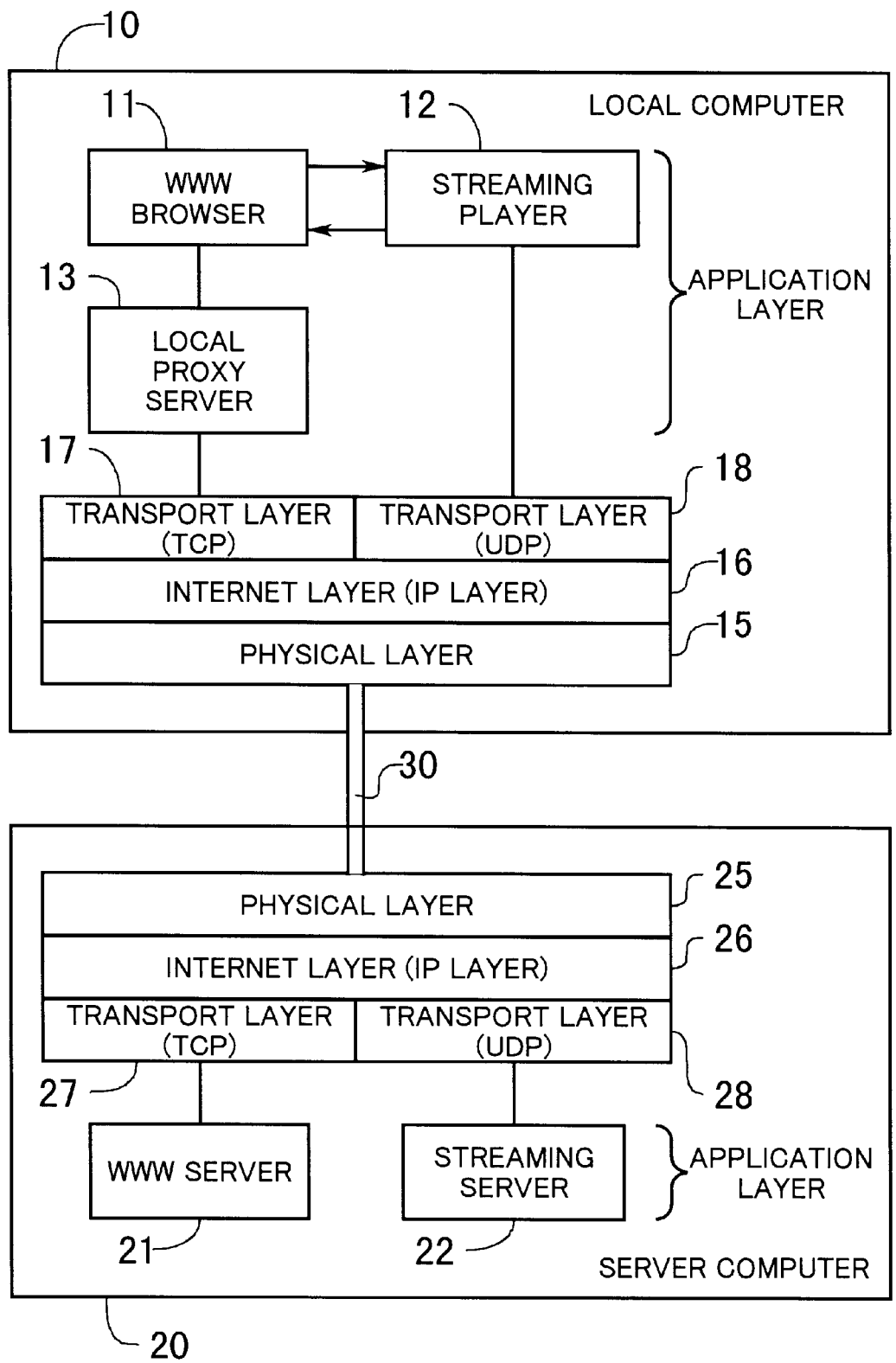
FIG. 3 is a diagram showing a network model of the system.

FIG. 3 shows a network model of the system. The local computer 10 and the server computer 20 are connected to the network 30 by respective Physical layers 15 and 25. At a level higher than the Physical layers 15 and 25 are constructed Internet layers {IP (Internet Protocol) layers} 16 and 26, respectively. Transport layers 17, 18, 27 and 28 are constructed at a higher level than the Internet layers. The Transport layers 17 and 27 are TCP (Transmission Control Protocol) layers, while the Transport layers 18 and 28 are UDP (User Datagram Protocol) layers.

The WWW browser 11 and the local proxy server 13 of the local computer 10 constitute an Application layer higher in level than the TCP Transport layer 17. The streaming player 12 is an Application layer higher in level than the UDP Transport layer 18. In the server computer 20, on the other hand, the WWW server 21 is an Application layer higher in level than the TCP Transport layer 27, while the streaming server 22 is an Application layer higher in level than the UDP Transport layer 28.

The WWW browser 11 and the streaming player 12 transmit and receive data to and from the respective servers. The following describes a basic procedure for transmitting and receiving data.

Figure 4:
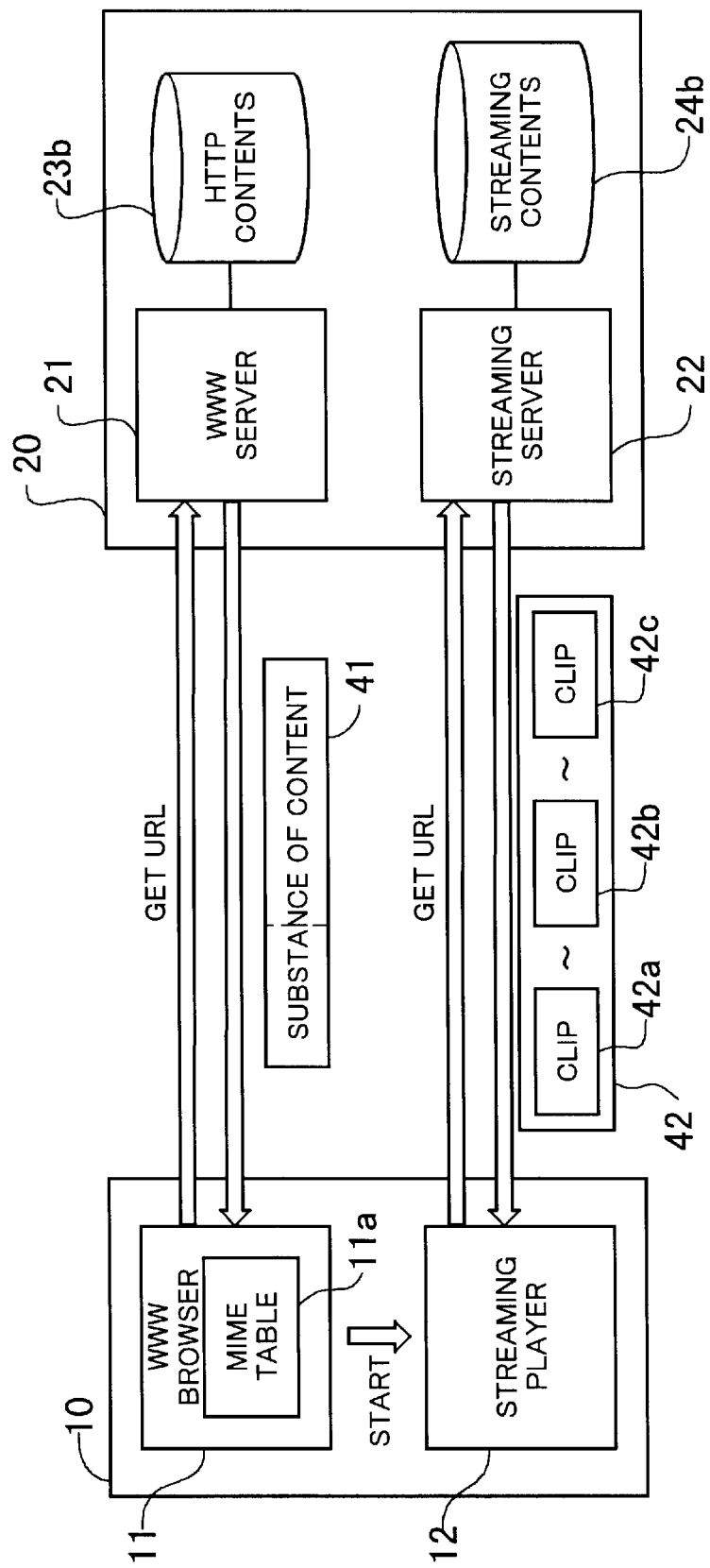
FIG. 4 is a diagram showing data flow between a client and a server.

FIG. 4 shows the flow of data between the client and the server. First, the WWW browser 11 issues an HTTP request GET, PUT, etc.) with respect to the WWW server 21 according to TCP.

Assuming as a general example that the user specifies "URL=http://fujisan.gmsnet.or.jp/hylintk/kanda.html" in the WWW browser 11, the request to the WWW server 21 is "GET http://fujisan.gmsnet.or.jp/hylintk/kanda.html".

Thereupon, the WWW server 21 fetches the requested HTML file from among the HTTP contents 23b, and prepares response data 41 by attaching header information to the file. Then, the WWW server 21 sends the response data 41 to the WWW browser 11. The response data 41 has contents mentioned below.

Figure 5:
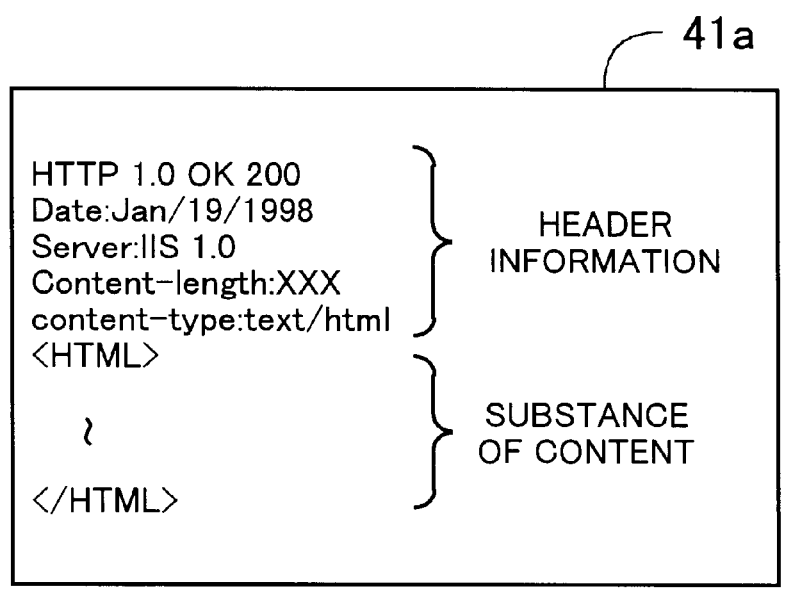
FIG. 5 is a diagram illustrating contents of response data.

FIG. 5 shows contents of the response data. The header information is attached at the beginning of the response data 41, and the substance of the content described in HTML follows go the header information. In the header information, MIME (Multipurpose Internet Mail Extension) information is included as "content-type".

A MIME table 11a is prepared in the WWW browser 11. In the MIME table lha are registered MIME types (HTML, JPEG, GIF, etc.) which can be processed by the browser itself as well as MIME types which are processed with the aid of a helper application or a plug-in application. On receiving the response data 41, the WWW browser 11 checks the MIME table 11a to determine whether the content can be processed by itself or should be processed by some other application. If the content can be processed by the WWW browser 11, the browser itself processes the content, and if the content is to be processed by some other application, the browser starts a corresponding program. When starting the program, the WWW browser passes the substance of the content on to the program as a parameter.

From time to time a streaming content is requested from the WWW browser 11. In such cases, the user specifies "URL=http://fujisan.gmsnet.or.jp/hylintk/01audio/hylintk1a.ram", for example. In this example, "hylintk1a.ram" specified by the URL is a metafile having the content "pnm://fujisan.gmsnet.or.jp/hylintk/01audio/hylintk1a.ra". The metafile denotes an intermediate file in accordance with which the WWW browser 11 starts the streaming player 12 and in which the URL of the streaming content to be reproduced is described. Upon specification of the content, the WWW browser 11 sends the request "GET http://fujisan.gmsnet.or.jp/hylintk/01audio/hylintk1a.ram" to the WWW server 21. In response to the request, the WWW server 21 sends back a response mentioned below.

Figure 6:
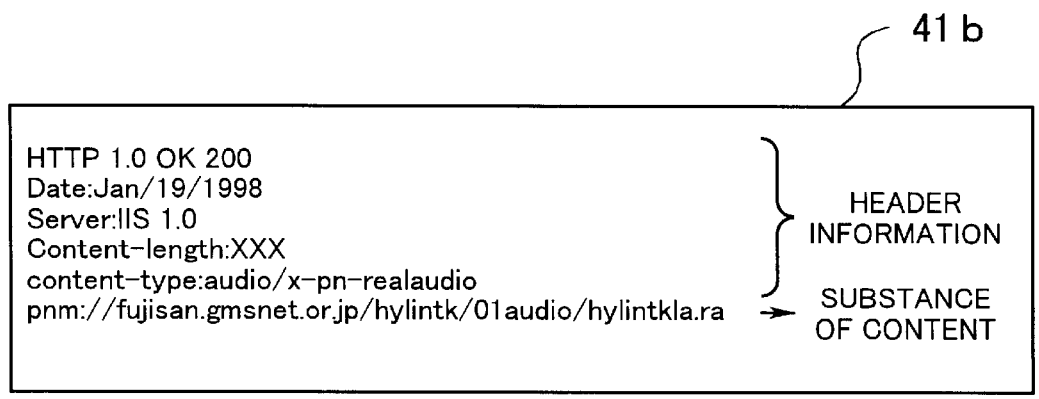
FIG. 6 is a diagram showing an example of response data in response to a request for a streaming content.

FIG. 6 shows an example of response data prepared in response to the request for the streaming content. In the response data 41b, "audio/x-pn-realaudio" is specified as the "content-type".

The WWW browser 11 receives "audio/x-pn-realaudio" as the MIME type, and therefore, it looks up the MIME table 11a and searches for a corresponding application, followed by the start of the application. At this time, the WWW browser passes the substance of the content received from the WWW server 21 on to the application as a parameter. In this example, the streaming player 12 is started and "pnm://fujisan.gmsnet.or.jp/hylintk/01audio/hylintk1a.ra" is passed on to this player as a parameter.

The streaming player 12 thus started issues a GET request with respect to the streaming server 22 by using the received parameter as URL. The streaming server 22 sends out a requested content 42 in the form of compressed data units of clips 42a to 42c to the streaming player 12. The streaming player 12 decompresses the clips transmitted thereto and reproduces sound/video.

The above is the procedure for accessing HTTP contents or streaming contents on the server computer 20.

If the HTTP contents 23b and the streaming contents 24b are information that need not be updated for a certain length of time, such contents can be stored in the auxiliary storage device 14 of the local computer 10. To this end, the HTTP contents 23b and the streaming contents 24b are copied directly to a CD-ROM. At this time, the control file 14a for the local computer 10 is also stored in the CD-ROM. The CD-ROM prepared in this manner is distributed to the user of the local computer 10. The user inserts the CD-ROM in the CD-ROM drive of the local computer 10, whereby the auxiliary storage device 14 as shown in FIG. 2 is configured within the local computer 10.

Also, in the server computer 20, the control file 23a for the HTTP contents 23b and the control file 24a for the streaming contents 24b are prepared and stored in the databases 23 and 24, respectively.

Figure 7:
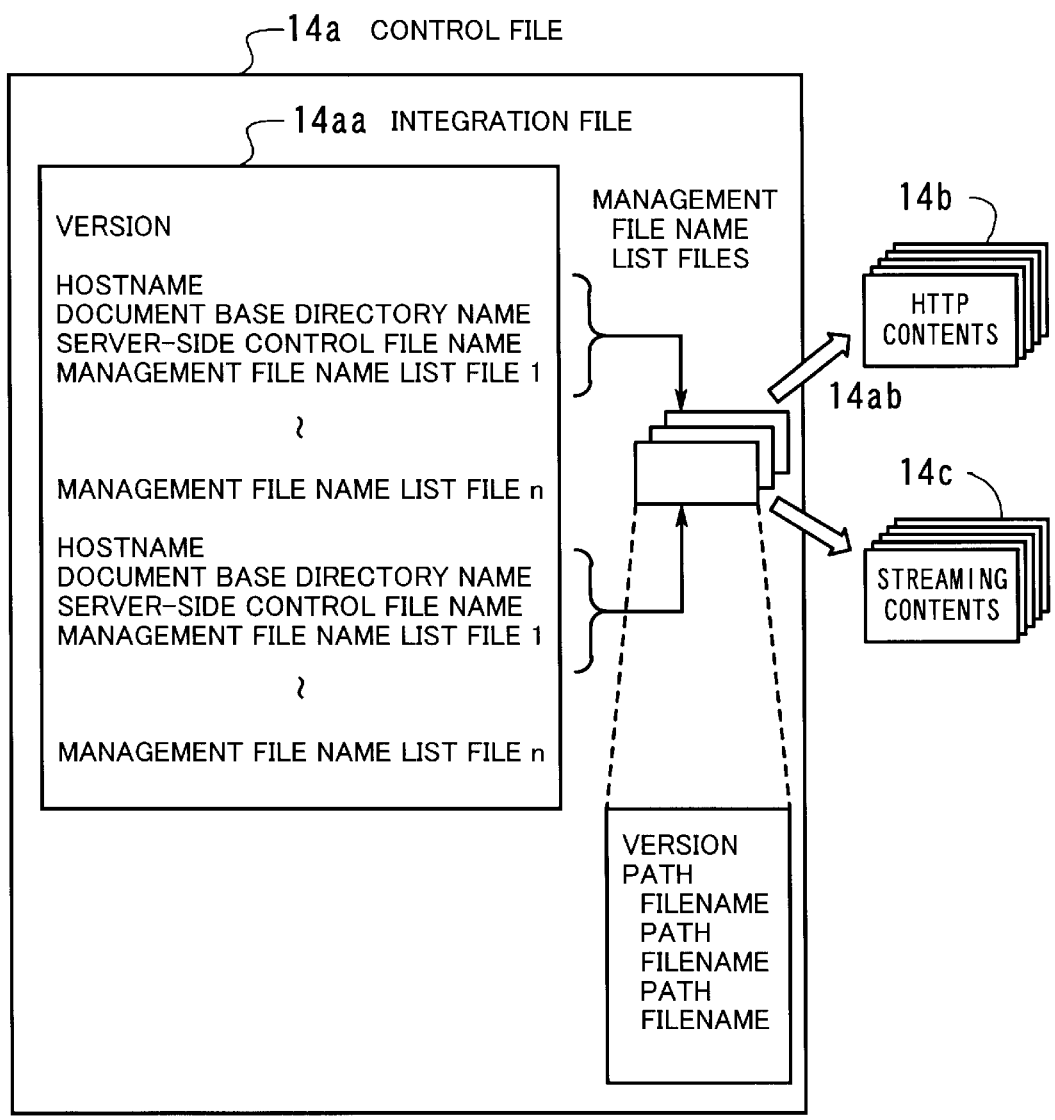
FIG. 7 is a diagram showing an example of a control file for a local computer.

FIG. 7 shows an example of the control file for the local computer. In the illustrated example, the control file 14a consists of a plurality of files including an integration file 14aa as a principal file. The control file name referred to herein denotes the filename of the integration file 14aa.

The integration file 14aa has its version described therein. Following the version, a set of information consisting of "HOSTNAME", "DOCUMENT BASE DIRECTORY NAME", "SERVER-SIDE CONTROL FILE NAME" and a plurality of "MANAGEMENT FILE NAME LIST FILES" is registered with respect to each of servers.

To "HOSTNAME" is also attached a corresponding IP address. "DOCUMENT BASE DIRECTORY NAME" indicates a base directory which is looked up when designating files in the server computer. "SERVER-SIDE CONTROL FILE NAME" indicates the name of the control file provided on the server computer side. As the control file name, the filename of the integration file of the server computer side is used.

The management file name list file 14ab is created for each of the contents and includes the version, path (route from the document base directory to the directory where a corresponding file exists) and filename of the corresponding content (HTTP content 14b, streaming content 14c). In cases where there is an image or the like to be shown in-line in the HTML file, the path and filename of the corresponding image file are also included.

Figure 8:
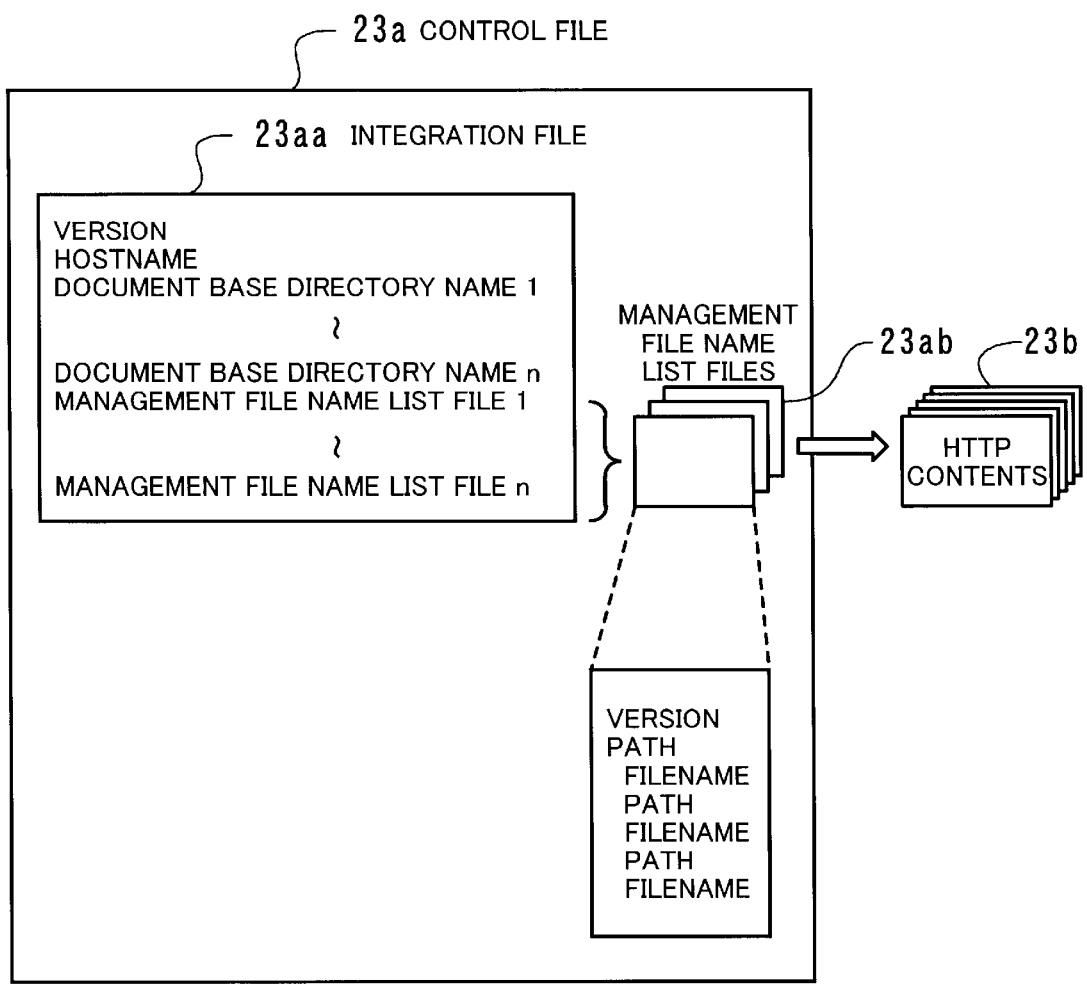
FIG. 8 is a diagram showing a control file 23a of a server computer side.

FIG. 8 shows the control file of the server computer side. The control file 23a on the side of the server computer 20 also comprises a set of an integration file 23aa and management file name list files 23ab.

The integration file 23aa has its version described therein. Following the version, a set of information consisting of "HOSTNAME", a plurality of "DOCUMENT BASE DIRECTORY NAMES", and a plurality of "MANAGEMENT FILE NAME LIST FILES" is registered. The management file name list file 23ab has contents similar to those of the management file name list file 14ab (shown in FIG. 7) of the local computer 10 side.

The following is a description of a process executed when a request is output from the WWW browser 11. Such a request from the WWW browser has the content "(command) (protocol)://(hostname)/(base pathname)/[(pathname/)] filename", and "GET" is used as a command to acquire a content. When accessing the WWW server 21, "http" is specified as the protocol, and when accessing the streaming server, "pnm" is specified as the protocol.

Figure 9:
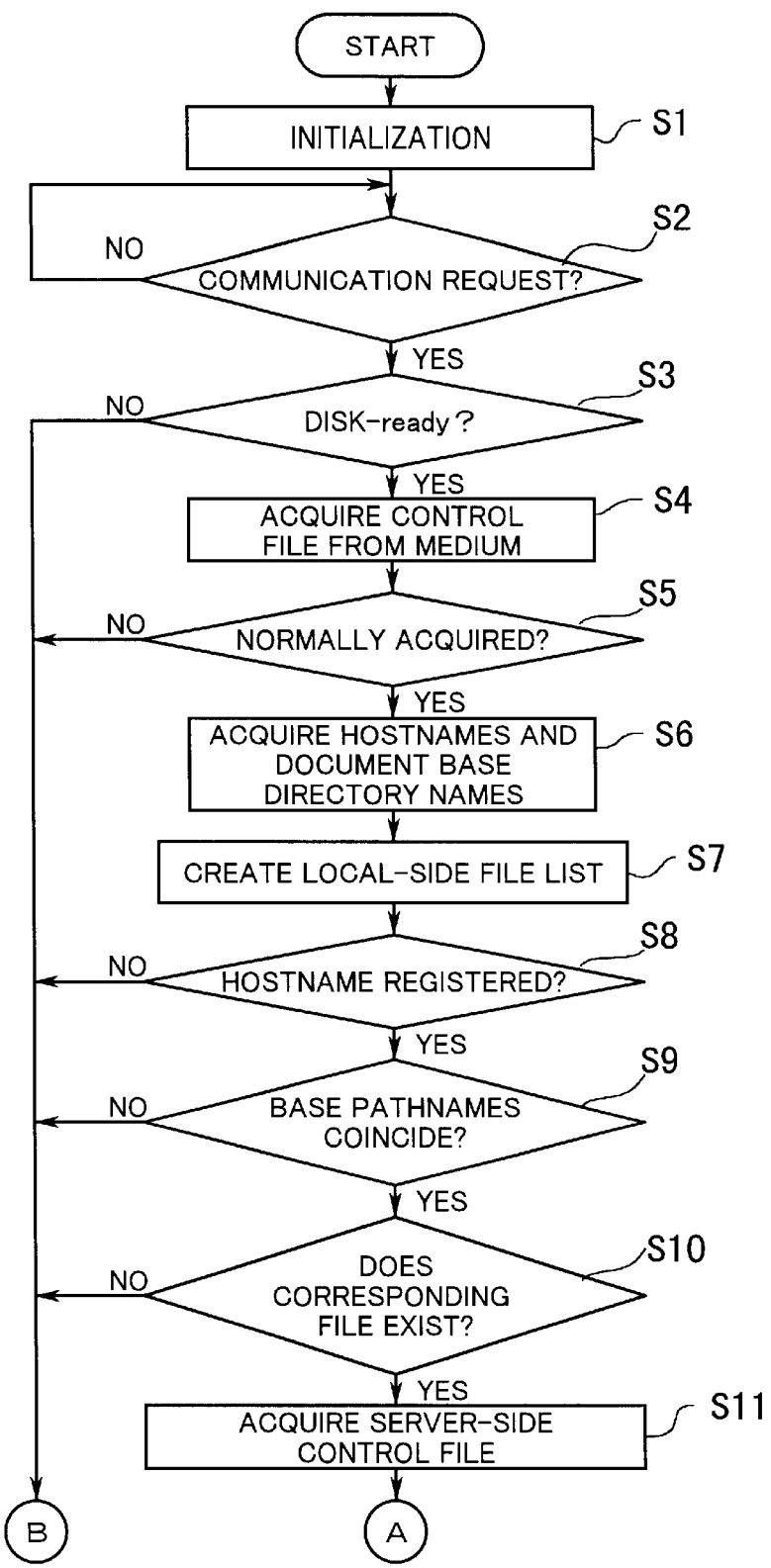
FIG. 9 is a flowchart showing the first half of a process executed by a local proxy server.

FIG. 9 is a flowchart showing the first half of a process executed by the local proxy server. The process below is in its entirety executed by the local proxy server 13.

[S1] Information retained during the previous process is initialized.

[S2] It is determined whether or not a communication request has been made from the WWW browser 11. If such a request has been made, the flow proceeds to Step S3; if not, this step is repeated.

[S3] It is determined whether or not the recording medium is ready for read operation. If the recording medium is ready for read operation, the flow proceeds to Step S4; if not, the flow proceeds to Step S22.

[S4] The control file 14a is acquired from the recording medium. In the example shown in FIG. 7, the integration file 14aa and the management file name list files 14ab are acquired.

[S5] It is determined whether or not the control file has been normally acquired. If the control file has been normally acquired, the flow proceeds to Step S6, and if the file fails to be found or a read error has occurred, the flow proceeds to Step S22.

[S6] All sets of hostnames and document base directory names are acquired from the control file 14a obtained as above.

[S7] A local-side file list is created. Specifically, the sets of pathnames and filenames are extracted from all management file name list files 14ab and are listed.

[S8] It is determined whether or not the hostname included in the request from the WWW browser 11 is registered in the control file 14a. If the hostname is registered, the flow proceeds to Step S9; if not, the flow proceeds to Step S22.

[S9] It is determined whether or not the base pathname included in the request from the WWW browser 11 coincides with the document base directory name registered in association with the hostname detected in Step S8. If the base pathname coincides with the document base directory name, the flow proceeds to Step S10; if not, the flow proceeds to Step S22.

[S10] Using the local-side file list, those pathnames and filenames in all management file name list files which are registered following the set of the hostname and the document base directory name detected in Steps S8 and S9 are extracted, and a determination is made as to whether or not there is a set of pathname and filename corresponding to that included in the request from the WWW browser 11. If a corresponding file exists, the flow proceeds to Step S11; if not, the flow proceeds to Step S22.

[S11] The server-side control file name corresponding to the set of the hostname and the base pathname detected in Steps S8 and S9 is extracted from the control file 14a, and the control file is acquired from a corresponding server.

Figure 10:
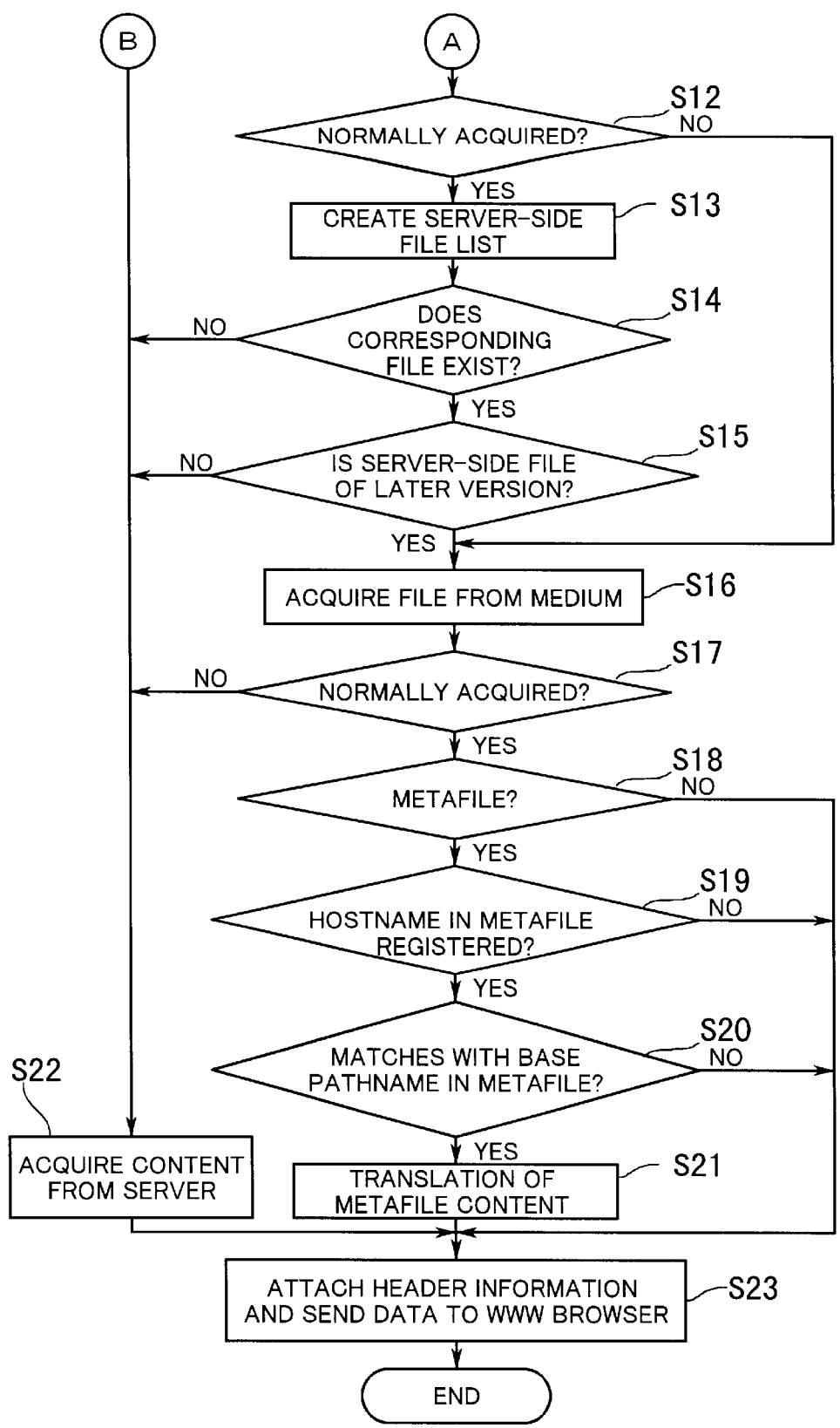
FIG. 10 is a flowchart showing the latter half of the process executed by the local proxy server.

FIG. 10 is a flowchart showing the latter half of the process executed by the local proxy server.

[S12] It is determined whether or not the server-side control file has been normally acquired. If the server-side control file has been normally acquired, the flow proceeds to Step S13, and if the acquisition of the file fails due to non-connection of line etc., the flow proceeds to Step S16.

[S13] Based on the server-side control file, a server-side file list is created. The server-side file list contains sets of pathnames and filenames of contents which are under the management of the server concerned.

[S14] It is determined based on the server-side file list whether or not there exists a set of pathname and filename corresponding to that included in the request from the WWW browser 11. If a corresponding file exists, the flow proceeds to Step S15; if not, the flow proceeds to Step S22.

[S15] The version number of the file detected in Step S10 is compared with that of the file detected in Step S14, to determine whether or not the server-side file has a later version number. If the server-side file is of a later version, the flow proceeds to Step S16; if not, the flow proceeds to Step S22.

[S16] A corresponding file is acquired from the auxiliary storage device 14.

[S17] It is determined whether or not the file has been normally acquired. If the file has been normally acquired, the flow proceeds to Step S18; if not, the flow proceeds to Step S22.

[S18] It is determined whether or not the acquired file is a metafile. If the acquired file is a metafile, the flow proceeds to Step S19; if not, the flow proceeds to Step S23.

[S19] It is determined whether or not the hostname described in the metafile is registered in the control file 14a. If the hostname is registered, the flow proceeds to Step S20; if not, the flow proceeds to Step S23.

[S20] It is determined whether or not the base pathname described in the metafile coincides with that registered in association with the hostname detected in Step S19. If the base pathnames coincide, the flow proceeds to Step S21; if not, the flow proceeds to Step S23.

[S21] The content of the metafile is subjected to translation. Specifically, the protocol is changed to "file", and the hostname and the base pathname are changed to those indicating the auxiliary storage device 14. For example, in the case of the metafile "pnm://fujisan.gmsnet.or.jp/hylintk/

01audio/hylintk1a.ra", its content is changed to "file:d:/hylintk/01audio/hylintk1a.ra". In this example, the auxiliary storage device is recognized as the drive name "d" in the local computer 10. After this process ends, the flow proceeds to Step S23.

The translation process in Step S21 is required because requests are relayed by the local proxy server which is at the level of the Application layer. Accordingly, if requests are relayed by a lower-level layer than the Application layer, then the translation process in Step S21 is unnecessary.

[S22] The content is acquired from the server.

[S23] Header information is attached to the acquired data, which is then sent to the WWW browser 11.

In this manner, contents can be acquired from among the HTTP contents 14b and streaming contents 14c stored in the auxiliary storage device 14. In the case of a streaming content, since the file content has been modified in Step S21, the streaming player 12 thereafter makes all requests for the streaming content 14c in the auxiliary storage device 14. This averts the influence of the transmission capacity of the transmission path and permits fast readout.

Also, since it is unnecessary to modify the contents to be stored in the auxiliary storage device 14, a CD-ROM to be distributed to the user of the local computer 10 can be prepared easily. Further, the user of the WWW browser 11 has only to make a request following the same procedure as that for acquiring a target content from the server, so that the user operation efficiency is not affected at all.

Contents once acquired can be recorded as cache data in a local writable recording medium such as a hard disk unit by the local proxy server 13. In this case, an extended control file is generated so that cached contents can be managed by the extended control file, and the path (including the drive name) to the extended control file and the filename of same are registered in the integration file 14aa. The extended control file also consists of an integration file and management file name list files. The integration file and management file name list files generated in this case are similar in content to those constituting the server-side control file.

By thus caching contents at the same time, it is possible to further reduce the amount of data that needs to be acquired through the network.

Where the local computer 10 is furnished with the caching function, the latest information in the server computer 20 may be downloaded collectively. In this case, after the local-side and server-side control files are acquired, the version numbers of all associated contents are compared with each other. Then, all those contents in the server which are judged to be of later version are acquired and stored in the local-side recording medium. This enables the local computer 10 to handle the latest contents even while the local computer 10 is thereafter used off-line.

Further, access sequence (order of priority) may be set for accessing the contents. This access sequence is specified in the local-side control file. On receiving a request from the WWW browser, the local proxy server 13 confirms whether the content exists or not in specified sequence, and recognizes the content detected earlier as a content to be accessed (in this case, comparison of version numbers is not performed). For example, the access sequence "extended local (contents cached in the writable recording medium) →reference local (contents stored in the CD-ROM in advance)→server (contents acquired through the network)" may be specified. In this case, once the latest information in the server computer 20 is downloaded collectively, it is unnecessary to access the server computer 20 thereafter, including the acquisition of the control file.

Also, a super version number that is always regarded as a maximum value may be made specifiable. The super version number requires no comparison and indicates that the content with this version number should be most preferentially accessed. For example, if the value of the version number is "00", the local proxy server 13 regards a content with this version number as a content having a maximum value of version number. By defining the super version number in this manner, the control can be simplified without the need for complicated version number management (in the case where server-side contents are regularly modified, a plurality of contents with different version numbers exist, making the management complicated). For example, the super version number may be set in a differential file, whereby the latest contents can always be recognized, facilitating the management of contents. The version number can also be used to indicate the superiority/inferiority of contents. For example, the local-side contents may be the super version number and may contain only summaries, and on the server side, contents may be managed according to conventional version number management.

Meanwhile, the OSs (Operating Systems), or the platforms, of the server computer 20 and the local computer 10 may not always the same. Different platforms adopt different rules for naming directories and files. Accordingly, naming rules usable in individual platforms are classified according to types, and file type identifiers are set for the respective groups. The file type identifiers are registered in the control file in association with the hostnames, whereby directory names and filenames can be specified such that they can be dealt with by the individual hosts.

Also, two different servers often have an identical base directory name. In such cases, if the contents under the same directory name of the two servers are directly stored in the auxiliary storage device of the local computer 10, their locations overlap each other. Accordingly, the contents of one of the two servers are stored at a different location. In this case, translation information indicating the correspondence between location information (path) about the location where the contents should originally be stored and location information (path) about the location where the contents are actually stored is stored in the control file of the local computer 10 side. Based on the translation information, the local proxy server 13 can correctly access the contents stored at a different location within the auxiliary storage device.

For example, in the case where "http://ashitaka.gmsnet.or.jp/r-pro/index.html" and "http://fujisan.gmsnet.or.jp/r-pro/index.html" are to be stored in the auxiliary storage device, these contents are stored as "¥r-pro¥index.html" and "¥r-pro1¥index.html", respectively. In the integration file in the local computer 10, HOST="ashitaka.gmsnet.or.jp"
BASE(01)="r-pro"and
HOST="fujisan.gmsnet.or.jp"
BASE(01)="r-pro"
RENAME="r-pro1"

are described. "HOST" indicates the hostname, "BASE" indicates the document base directory, and "RENAME" indicates the location information about the location to be translated into. Consequently, when "http://ashitaka.gmsnet.or.jp/r-pro/index.html" is requested from the WWW browser, the local proxy server 13 can access "¥r-pro¥index.html", and when "http://fujisan.gmsnet.or.jp/ r-pro/index.html" is requested, the local proxy server can access "¥r-pro1¥index.html".

Further, after information to be stored in the local computer 10 is created, the locations or names of files of contents may be changed on the server side, so that the structure changes. In such cases, information about the change of the file structure is set in the server-side integration file. Specifically, the names of the directories and files before the change are correlated with the names of the directories and files after the change. Once the server-side control file is acquired, therefore, the local proxy server 13 can recognize the correspondence to the local-side contents based on file information about the structure before the change, and also can access corresponding server-side contents based on file information about the structure after the change.

Also, settings may be made in the server-side integration file such that a specific file is inhibited from being retained as cache data. When such a file which is inhibited from being kept as cache data is acquired, the local proxy server 13 transfers the file content to the WWW browser but does not store it in the hard disk unit. This prevents the local computer 10 from making an illegal copy.

In the foregoing description of the example, the contents stored on the server side are duplicated and stored in the auxiliary storage device of the local computer 10, but duplicates so obtained may not necessarily be exactly the same as the contents stored on the server side. For example, low-resolution image data may be stored on the server side, and sharper image data corresponding to the server-side image data may be stored in a CD-ROM etc. to be inserted in the CD-ROM drive of the local computer 10. In this case, the local proxy server 13 may be designed to compare information on the resolutions of the image data, instead of the version numbers, and acquire higher-resolution image data. Consequently, if corresponding data is stored in the local computer 10, high-quality data is acquired, and if data cannot be acquired but through the network, low-quality data is acquired. This serves to reduce the amount of data transmitted when images are viewed through the network.

The local proxy server may be designed to always acquire contents, if present, from the auxiliary storage device 14, and in this case, the amount of data acquired through the network can be further cut down.

A second embodiment will be now described. According to the second embodiment, synchronization of a streaming content with other contents (e.g., still images) can be controlled reliably.

First, conventional synchronization control will be explained. The synchronization control is used when reproducing a streaming content, so as to display images on screen in a manner timed to the progress of the content, for example. In such cases, a streaming content is transmitted from the streaming server while images are transmitted from the WWW server. It is therefore necessary to synchronize a plurality of data with one another.

Conventionally, synchronization files are kept on the streaming server, and when a streaming content is to be reproduced by the streaming player, a corresponding synchronization file is acquired from the streaming server. The synchronization file specifies which image to be opened in which time zone with respect to a reference time at which reproduction of the streaming content is started.

FIG. 11 shows an example of the synchronization file. As shown in the figure, a plurality of sets of display start and end times are set with respect to JPEG image files.

After acquiring the synchronization file, the streaming player monitors passage of time on the basis of the reference time at which reproduction of the simultaneously acquired streaming content was started. Then, the streaming player requests, fetches and reproduces clips of the streaming content and, when a start time specified in the synchronization file has come, sends the relevant URL to the WWW browser to request same to display a corresponding content. Based on the received URL, the WWW browser outputs a request for the corresponding image file to the WWW server and receives the content. The content received is displayed on the screen of the display device of the client computer.

In this manner, images matching the reproduced streaming content can be displayed on the WWW browser in a manner synchronized with the reproduction of the content. The conventional technique is, however, based on the precondition that the substance of a streaming content is the same whenever reproduction of the content is started, and thus cannot be applied to live broadcasting through the Internet, for example.

Live broadcasting denotes a form of delivery of a streaming content such that "the streaming content is delivered and can be reproduced only during an absolute time zone (e.g., 8:00 p.m. to 8:30 p.m. of Jan. 28, 1998)". Live broadcasting can be accomplished in two ways. A first method is to broadcast a prerecorded content over a specified time zone only, and a second method is to broadcast live, that is, to broadcast sound being actually recorded over a specified time zone only.

In the case of live broadcasting by the first method, the streaming player treats the origin of a synchronization time axis as "0 (zero)", and therefore, images to be synchronously displayed lag behind, depending on the time at which the player is started.

Figure 12:
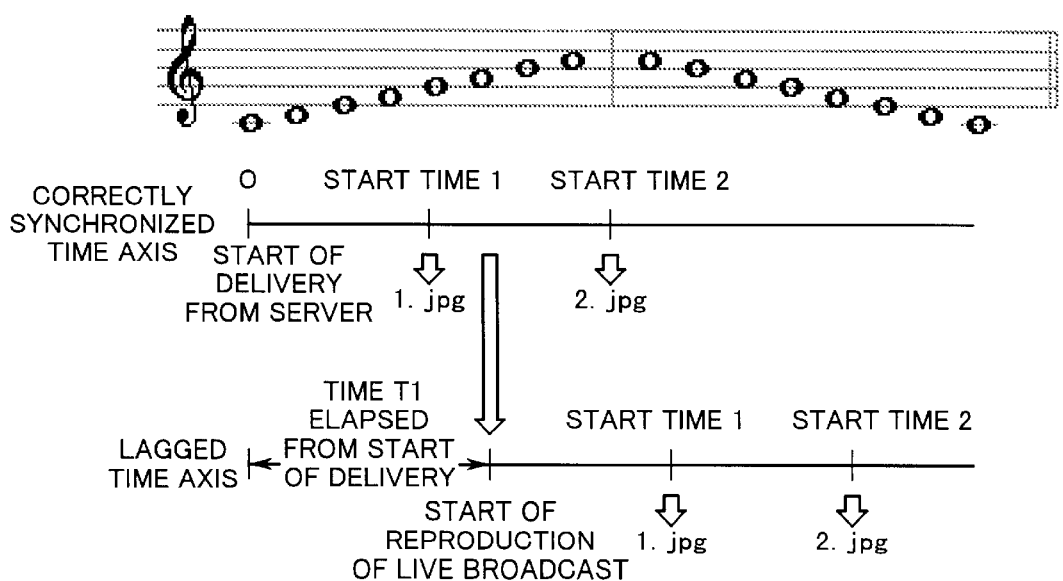
FIG. 12 is a diagram illustrating a lag of a synchronization time axis.

FIG. 12 illustrates such a lag of the synchronization time axis. If the streaming content is reproduced on the correctly a synchronized time axis as shown in the figure, appropriate images are displayed at the times intended by the content provider. When music is reproduced, for example, images matching its melodies are displayed.

However, if the streaming content is reproduced at a later time, the display of the images lags behind correspondingly. For example, if reproduction of the streaming content is started five minutes after the start of a live music broadcast, the music is reproduced from halfway through, but images etc. are displayed on the basis of the reference time at which the reproduction was started. Consequently, images etc. that should be displayed synchronously are all displayed five minutes behind the music.

To solve the problem, a method may be employed wherein, at the request of the streaming player, a time T1 elapsed from the start of a live performance is sent from the streaming server to the local computer. On receiving the elapsed time T1, the streaming player passes the relevant URL on to the WWW browser by using, as the reference time, a time traced back by T1 from its own time, whereby a lag of the time of starting reproduction by the streaming player can be compensated for.

Such asynchrony can also be compensated for by performing synchronization control by the streaming server. In this case, the clips of the streaming content and their relevant information need to be correlated with each other by some method or other before they are passed on to the streaming player. One such method is to embed relevant URL information in clips, as described below as a second embodiment of the invention.

Figure 13:
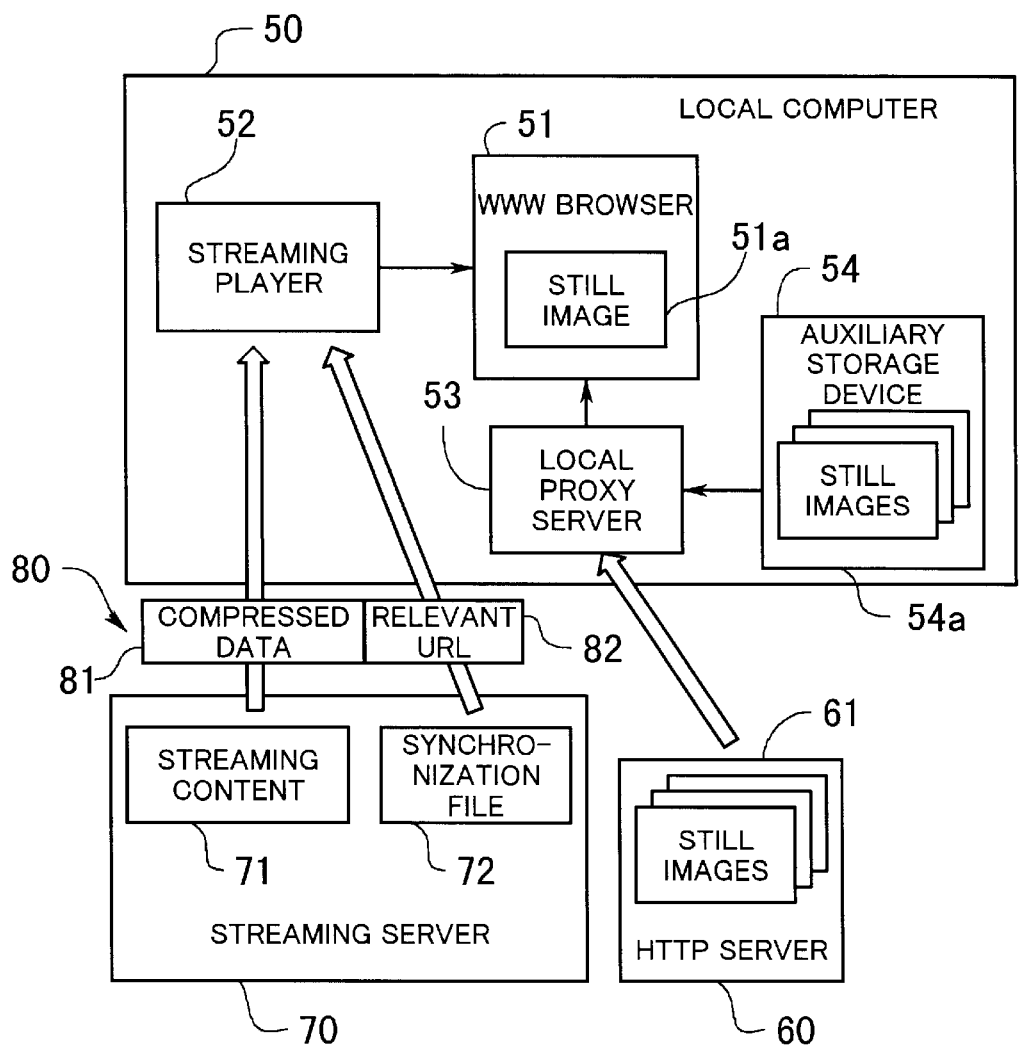
FIG. 13 is a diagram showing a configuration according to a second embodiment of the present invention.

FIG. 13 shows a configuration according to the second embodiment of the present invention. In this embodiment, the technique explained with reference to the first embodiment is also used to curtail the amount of data to be transmitted.

A local computer 50 includes a WWW browser 51, a streaming player 52, a local proxy server 53, and an auxiliary storage device 54. Among these, the WWW browser 51, the local proxy server 53 and the auxiliary storage device 54 have the same functions as the respective elements with the same names explained above with reference to the first embodiment. The auxiliary storage device 54 has still images 54a stored therein beforehand. An HTTP server 60 provides still images 61 through a network. A streaming server 70 includes a streaming content 71 and a synchronization file 72 associated therewith. The synchronization file 72 is stored in the same directory as its corresponding streaming content 72, and the filename thereof differs from that of the corresponding streaming content 71 only in the extension. Accordingly, the synchronization file 72 associated with the streaming content 71 can be easily located.

In the system configured as described above, on acquiring a metafile specifying the streaming content 71, the WWW browser 51 of the local computer 50 starts the streaming player 52 and passes the content of the metafile on to the player. The streaming player 52 then outputs a request for acquisition of the streaming content 71 to the streaming server 70.

When a prespecified time has come, the streaming server 70 creates compressed data 81 by dividing the streaming content 71, and extracts a relevant URL 82 to be synchronized with the compressed data 81 from the synchronization file 72. Clips, each of which basically consists of compressed data 81 alone, are successively delivered to all local computers which made the acquisition request. At this time, the streaming server 70 manages passage of time from the start of delivery of the streaming content 71 while looking up the synchronization file 72 associated with the content. When a start time specified by the information in the synchronization file 72 has come, a clip 80 is created by combining compressed data 81 with the relevant URL 82, and the clip 80 thus including the URL of the content to be synchronized is sent out to the local computer 50.

The clip 80 sent out from the streaming server 70 is received by the streaming player 52. The streaming player 52 decompresses and reproduces the compressed data 81 in the clip 80 and, if the relevant URL 82 is included, passes the relevant URL 82 on to the WWW browser 51. The WWW browser 51 sends a request for the relevant URL 82 to the local proxy server 53. If the latest still image of the specified URL is stored in the auxiliary storage device 54, the local proxy server 53 acquires the still image 54a from the auxiliary storage device 54; otherwise the still image 61 is acquired from the HTTP server 60. The still image 51a acquired by the local proxy server 53 is passed on to the WWW browser 51 and displayed on screen.

In this manner, the streaming server 70 manages the synchronization file 72 and the relevant URLs are included in clips of the streaming content 71, whereby the correspondence between the reproduced content and its relevant information can be maintained whenever the streaming content is requested from the local computer 50.

In the case of delivering a live broadcast, and not a prerecorded content, the broadcast program often does not progress as scheduled, so that the synchronization file cannot be created beforehand.

Therefore, in the case of a live broadcast, relevant URLs for still images matching the progress of the live broadcast are generated when ever necessary, and are combined with compressed data. This permits synchronization control to be performed correctly even in the case of a live broadcast.

By using such live broadcast synchronization control, it is possible to centralize the management of a plurality of live encoder contents and to reproduce the contents while synchronizing all contents.

Namely, with the conventional streaming server having no synchronization control function, if the sounds of musical instruments played at various places in the world are managed in a centralized manner by the streaming server to broadcast a live orchestra performance, all packets are concentrated at the streaming server, so that delay of some packets inevitably occurs due to collision of packets. Even a small time lag can make an orchestra performance very unpleasant to listen to.

The following is a description of a system according to a third embodiment wherein a streaming server has a content buffering function and is capable of eliminating a time lag.

Figure 14:
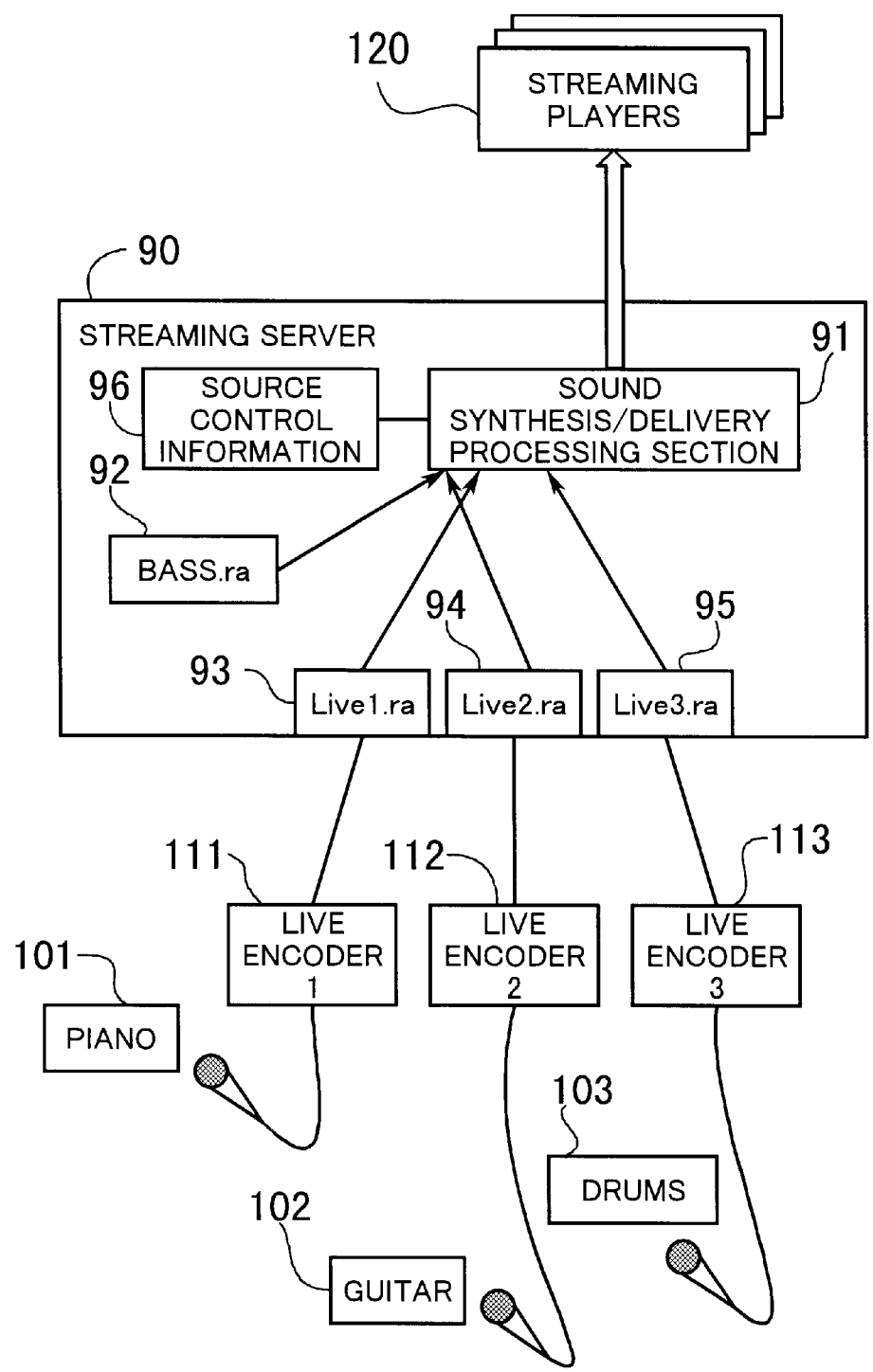
FIG. 14 is a diagram showing a configuration according to a third embodiment of the present invention.

FIG. 14 shows a configuration according to the third embodiment of the present invention. A streaming server 90 acquires live performance information from a plurality of live encoders 111 to 113, and delivers the information to a plurality of streaming players 120 while synchronizing the performances.

The live encoder 111 records the sound of a piano 101 and sends the recorded sound to the streaming server 90. The live encoder 112 records the sound of a guitar 102 and sends the recorded sound to the streaming server 90, and the live encoder 113 records the sound of drums 103 and sends the recorded sound to the streaming server 90.

The streaming server 90 stores in advance a file 92 in which a bass sound is recorded. The sounds from the individual live encoders 111 to 113 are temporarily stored in respective files 93 to 95. Also, source control information 96 defining performance time zones for the respective sound sources is prepared beforehand.

The source control information 96 has the format "source URL, start time, endtime, {, synchronousURL}". The synchronous URL is used for the purpose of synchronization with images etc., as in the second embodiment.

FIG. 15 shows an example of the source control information. In this example, source control information 96 controls a performance lasting for a total of three minutes. The description following ";" denotes a mere comment.

The streaming server 90 manages the time axis by using, as the origin, timing at which the conductor instructed to start the performance. Also, the streaming server buffers, by means of the files 93 to 95, the data transmitted from the respective live encoders 111 to 113, and adjusts the start and end times according to the source control information. This makes it possible to perfectly synchronize the mixing and delivery of data.

Figure 16:
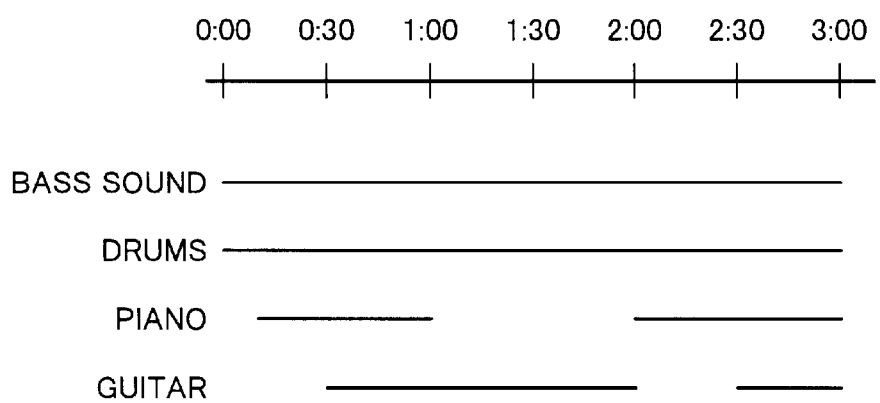
FIG. 16 is a diagram showing the result of performance according to the source control information shown in FIG. 15.

FIG. 16 shows the result of performances according to the source control information shown in FIG. 15. As illustrated, the performances are started and ended at the respective times specified in the source control information 96.

If the number of streaming players requesting information is large, an overhead problem of how to manage within the server the streaming data for the individual players arises. In such cases, the source control information may be transferred to the streaming players. The streaming player which is to receive the source control information needs to have a sound synthesis processing section (equivalent to the sound synthesis/delivery processing section of the streaming server but excluding the delivery function), and a file for buffering the streaming data. If the live performance had already been started when a streaming player output a request, the streaming server transmits a time elapsed from the start of the performance to the streaming player. This eliminates a time lag that depends upon the time of start of reproduction.

In the above example, a live performance broadcast is taken as an example, but a prerecorded streaming content may alternatively be controlled in like manner.

Where sound data is in the form of MIDI (Musical Instrument Digital Interface) file, sounds can be synthesized easily. The above embodiment is therefore especially effective in the live broadcasting using MIDI files.

The contents of the functions to be accomplished by the individual computers may be described in a program recorded in a computer-readable recording medium. By executing the program by a computer, it is possible to perform the above-described process. The computer-readable recording medium includes a magnetic recording device, a semiconductor memory and the like. To distribute the program to the market, the program may be stored in portable recording media such as CD-ROMs or floppy disks. Alternatively, the program may be stored in the storage device of a computer connected to a network and may be transferred to other computers through the network. To execute the program by a computer, the program stored in a hard disk unit or the like of the computer is loaded into the main memory and executed.

As described above, according to the present invention, duplicate information of delivery information is stored in the local computer, and the local proxy server receives a request to acquire delivery information in the server computer and determines appropriate information to be acquired, whereby the amount of information exchanged with the server computer can be reduced. Also, since duplicate of the delivery information has only to be stored in the local computer, preparation of duplicate information never consumes much labor or time. Further, the user may follow the same operation procedure as that for acquiring information from the server computer, and therefore, no additional burden is imposed on the user.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An information management system for management of information delivered through a network, comprising:

a server computer including delivery information storing means for storing delivery information to be delivered through the network and a server-side control file in which attribute information of the delivery information is registered, and a server for delivering, in response to a request, information stored in the delivery information storing means; and a local computer including duplicate information storing means for storing duplicate information corresponding to the delivery information in the delivery information storing means and a local-side control file in which are registered location information indicative of a location within the delivery information storing means where the duplicate information existed and attribute information of the duplicate information, and request relaying means, responsive to a request to acquire the delivery information stored in the delivery information storing means, for acquiring the server-side control file and the local-side control file, comparing the attribute information of the requested delivery information with the attribute information of the duplicate information corresponding to the requested delivery information, and determining information to be acquired in accordance with a result of comparison.

2. The information management system according to claim 1, wherein the delivery information storing means of the server computer registers therein a version number of the delivery information as the attribute information, the duplicate information storing means of the local computer registers therein a version number of the duplicate information as the attribute information, and the request relaying means decides to acquire the delivery information if the delivery information is of a later version, and decides to acquire the duplicate information in other situations.

3. The information management system according to claim 1, wherein the delivery information storing means of the server computer is capable of setting therein, as a version number of the delivery information, a super version number indicating that the version number is always a maximum, the duplicate information storing means of the local computer is capable of setting therein, as a version number of the duplicate information, a super version number indicating that the version number is always a maximum, and the request relaying means decides, on detecting a super version number, to always preferentially acquire corresponding information.

4. The information management system according to claim 1, wherein the request relaying means of the local computer decides to acquire the duplicate information if the server-side control file cannot be fetched from the server computer.

5. The information management system according to claim 1, wherein the request relaying means of the local computer decides to acquire the delivery information if the duplicate information corresponding to the requested delivery information does not exist in the duplicate information storing means.

6. The information management system according to claim 1, wherein the local computer further includes a writable recording device, and when the delivery information is acquired, the request relaying means stores the acquired delivery information in the recording device.

7. The information management system according to claim 6, wherein, on receiving a request to acquire the delivery information stored in the delivery information storing means, the request relaying means of the local computer determines information to be acquired from among the delivery information, the duplicate information, and the delivery information stored in the recording device.

8. The information management system according to claim 1, wherein the local computer further includes a writable recording device, and when the server-side control file and the local-side control file are acquired, the request relaying means compares version numbers of all associated information in the server-side and local-side control files with each other, decides to acquire all of the delivery information in the delivery information storing means that is judged to be of a later version, and stores all of the acquired delivery information in the recording device.

9. The information management system according to claim 1, wherein, when it is decided to acquire the duplicate information and if the duplicate information is a metafile specifying other information, the request relaying means of the local computer modifies content of the metafile such that the specification of the other information indicates an inside of the duplicate information storing means.

10. The information management system according to claim 1, wherein, when sequence of access to the delivery information storing means and the duplicate information storing means is specified in the local-side control file, the request relaying means of the local computer decides to acquire information which is given preference by the access sequence, without comparing the attribute information.

11. The information management system according to claim 1, wherein the duplicate information storing means of the local computer stores the duplicate information in an arrangement identical with that in the server computer and, if a location where the duplicate information is to be stored overlaps that where other information is to be stored, stores the duplicate information at a different location and sets, in the local-side control file, translation information indicating correspondence between the location where the duplicate information should originally be stored and that where the duplicate information is actually stored, and the request relaying means specifies, based on the translation information, the location where the duplicate information is stored.

12. The information management system according to claim 1, wherein, when a location where the delivery information is stored is changed from a previous location, the delivery information storing means of the server computer registers, in the server-side control file, storage location change information indicating correspondence between the storage locations before and after the change, and the request relaying means of the local computer specifies, based on the storage location change information, the duplicate information corresponding to the delivery information.

13. An information management system for management of information delivered through a network, comprising:

a server computer including delivery information storing means for storing delivery information to be delivered through the network and a server-side control file in which attribute information of the delivery information is registered, and a server for delivering, in response to a request, information stored in the delivery information storing means; and a local computer including a readout device and request relaying means, the readout device being capable of reading out contents of a recording medium storing duplicate information corresponding to the delivery information in the delivery information storing means, location information indicative of a location within the delivery information storing means where the duplicate information existed, and a local-side control file in which attribute information of the duplicate information is registered, the request relaying means being responsive to reception of a request to acquire the delivery information stored in the server computer, to acquire the server-side control file and the local-side control file in the recording medium inserted in the readout device, compare the attribute information of the requested delivery information with the attribute information of the duplicate information corresponding to the requested delivery information, and determine information to be acquired in accordance with a result of comparison.

14. The information management system according to claim 1, wherein, when a request to acquire a streaming content whose content varies with time is received, the server of the server computer transmits, along with the streaming content, a synchronization file defining information to be synchronized with the streaming content, and a synchronization reference time serving as a basis for displaying the information defined in the synchronization file, and the local computer further includes streaming content reproducing means for outputting a request for acquisition of the streaming content, reproducing the streaming content transmitted thereto in response to the request, and outputting, in synchronism with the streaming content, a request for acquisition of information defined in the synchronization file by using as a basis the synchronization reference time transmitted thereto from the server.

15. The information management system according to claim 1, wherein, when a streaming content whose content varies with time is to be provided, the server of the server computer transmits unit information obtained by dividing the streaming content, the unit information being affixed with a specification of relevant information to be synchronized with the streaming content, and the local computer further includes streaming content reproducing means for outputting a request for acquisition of the streaming content, reproducing the unit information of the streaming content transmitted thereto in response to the request, and, if the unit information is affixed with the specification of the relevant information, outputting a request for acquisition of the specified relevant information.

16. A local computer connected through a network to a server computer storing delivery information and a server-side control file in which attribute information of the delivery information is registered, comprising:

duplicate information storing means for storing duplicate information corresponding to the delivery information in the server computer, and a local-side control file in which are registered location information indicative of a location within the server computer where the duplicate information existed and attribute information of the duplicate information; and request relaying means, responsive to a request to acquire the delivery information stored in the server computer, for acquiring the server-side control file and the local-side control file, comparing the attribute information of the requested delivery information with the attribute information of the duplicate information corresponding to the requested delivery information, and determining information to be acquired in accordance with a result of comparison.

17. A local computer connected through a network to a server computer storing delivery information and a server-side control file in which attribute information of the delivery information is registered, comprising:

a readout device capable of reading out contents of a recording medium storing duplicate information corresponding to the delivery information in server computer, location information indicative of a location within the server computer where the duplicate information existed, and a local-side control file in which attribute information of the duplicate information is registered; and request relaying means, responsive to a request to acquire the delivery information stored in the server computer, for acquiring the server-side control file and the local-side control file in the recording medium inserted in the readout device, comparing the attribute information of the requested delivery information with the attribute information of the duplicate information corresponding to the requested delivery information, and determining information to be acquired in accordance with a result of comparison.

18. A computer-readable recording medium recording an information acquisition program for managing acquisition of information from a server computer storing delivery information and a server-side control file in which attribute information of the delivery information is registered, wherein the information acquisition program causes a computer to function as duplicate information storing means for storing duplicate information corresponding to the delivery information in the server computer and a local-side control file in which are registered location information indicative of a location within the server computer where the duplicate information existed and attribute information of the duplicate information, and request relaying means, responsive to reception of a request to acquire the delivery information stored in the server computer, for acquiring the server-side control file and the local-side control file, comparing the attribute information of the requested delivery information with the attribute information of the duplicate information corresponding to the requested delivery information, and determining information to be acquired in accordance with a result of comparison.

* * * * *